US006216657B1

(12) United States Patent
Paffrath et al.

(10) Patent No.: US 6,216,657 B1
(45) Date of Patent: Apr. 17, 2001

(54) PROCESS FOR REGULATING AIR CONSUMPTION IN THE INTAKE TRACT OF AN INTERNAL COMBUSTION ENGINE AND INTAKE PIPE FOR CARRYING OUT THE PROCESS

(75) Inventors: Holger Paffrath, Ludwigsburg; Thomas Pauer, Freiberg, both of (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/355,101

(22) PCT Filed: Jan. 23, 1998

(86) PCT No.: PCT/EP98/00360

§ 371 Date: Sep. 10, 1999

§ 102(e) Date: Sep. 10, 1999

(87) PCT Pub. No.: WO98/32958

PCT Pub. Date: Jul. 30, 1998

(30) Foreign Application Priority Data

Jan. 24, 1997 (DE) .............................................. 197 02 317

(51) Int. Cl.[7] .................................................... F02M 35/10

(52) U.S. Cl. ................................ 123/184.53; 123/184.55

(58) Field of Search ........................ 123/184.53, 184.55, 123/184.56, 184.61, 585, 190.16

(56) References Cited

U.S. PATENT DOCUMENTS

| | | | |
|---|---|---|---|
| 4,932,369 * | 6/1990 | Parr | 123/184.42 |
| 5,033,417 * | 7/1991 | Basshuysen et al. | 123/184.55 |
| 5,156,117 * | 10/1992 | Muller et al. | 123/184.31 |
| 5,603,296 * | 2/1997 | Park | 123/184.55 |
| 5,709,182 * | 1/1998 | Espe et al. | 123/184.55 |

* cited by examiner

*Primary Examiner*—Willis R. Wolfe
*Assistant Examiner*—Hai Huynh
(74) *Attorney, Agent, or Firm*—Evenson, McKeown, Edwards & Lenahan, P.L.L.C.

(57) ABSTRACT

A process and device are disclosed for controlling air consumption in the intake tract of an internal combustion engine. Air intake in the intake tract (2) can be subdivided via at least two ram tubes (3, 4). The intake path can be continuously controlled in one of the ram tubes (4) between a totally open state and a closed state and prolong the other ram tube (3). The ram tube (4) in which the intake path can be continuously controlled between a totally open state and a closed state is preferably the shortest ram tube (4).

12 Claims, 2 Drawing Sheets

1
6
2
5
3
4
8
7

PROCESS FOR REGULATING AIR CONSUMPTION IN THE INTAKE TRACT OF AN INTERNAL COMBUSTION ENGINE AND INTAKE PIPE FOR CARRYING OUT THE PROCESS

STATE OF THE ART

The invention relates to a process for regulating air consumption of an internal combustion engine according to the principal claim, and an intake pipe for the practice of the process according to a subordinate claim.

In an intake pipe disclosed in EP 0 355 960 A2, a control of the amount of air or the air consumption in the intake tract of an internal combustion engine by an alternating switching of different ram tubes is described. A rotary damper is present as a kind of gate with an internally situated passage in which the passage in one position of the gate connects the one ram tube and in the other position connects the other ram tube to the particular cylinder of the internal combustion engine.

STATEMENT OF THE PROBLEM

The invention is thus addressed to the problem of improving a method and an apparatus of the kind described above so as to achieve an easily made, reliably operating and inexpensive intake tube in which the air consumption can easily be optimized.

ADVANTAGES OF THE INVENTION

The problem is solved by the invention by the fact that, in at least one intake tract of an internal combustion engine, an easily made intake tube is created, that the intake tract leads into at least two ram tubes of different length, while according to the invention, to control the air flow or air consumption in the entire intake path, at least one of the ram tubes can be steplessly varied between fully open and closed, and the other ram tube can be connected.

In an especially advantageous embodiment, the control means is disposed in the area of the shorter ram tube. By this arrangement the shorter of the ram tubes can be short-circuited in case of the need for varying air consumption requirements.

In an especially advantageous intake tube for the practice of the above-stated process, the at least one ram tube has a rotary damper by means of which the ram tube is continuously controlled, resulting in the stated advantages regarding air consumption in internal combustion engines.

An advantageous embodiment of the intake tube according to the invention provides for the rotary damper to be disposed in the mouth area of the ram tubes, the result being that no dead zones form in the intake tract of the intake tube. This arrangement facilitates both the assembly and the maintenance of the rotary damper units, since they can be made as a part for multi-cylinder internal combustion engines, for example, so that one needs only to insert them into or remove them from the passage openings provided therefor.

An advantageous embodiment results if the rotary damper and/or the intake tube consists of plastic. By executing them in plastic, clear weight and cost advantages can be achieved.

Also, provision can be made according to the invention for the intake tract to communicate by means of the ram tubes with an air intake distributor. The common use of functional units leads to a further saving of weight and cost.

In another advantageous embodiment, the rotary damper is controlled by vacuum. Vacuum is available at no cost in an internal combustion engine, e.g., in its intake tract, especially the vacuum that depends on the various load states of the internal combustion engine.

An advantageous embodiment of the invention provides for the control of the rotary damper to be performed electromagnetically and/or hydraulically.

In another advantageous embodiment, the rotary damper is controlled by a connected push and pull rod which is attached to the front of the rotary damper such that an adjusting thrust can be transferred by it to the rotary damper. In this manner the rotary damper can supply to all cylinders air matched to the particular operating situation of the internal combustion engine.

Also, provision can be made according to the invention for the rotary damper to be controlled by a connected stepper motor. The use of an electric, for example, stepper motor permits the low-tolerance adjustment of the throttle valve.

An advantageous embodiment of the invention provides for the plastic of the rotary damper to be doped with lubricants, which clearly improves the pivoting or sliding performance of the rotary damper in the intake tube.

The rotary damper can, in a known manner, be constructed as a cylindrical gate which can open or close passages by rotation. The cylindrical gate is in this case supported on a bearing in a housing and can be held, and also sealed if necessary, in a particular position by an element acting as a spring.

Additional advantageous embodiments are to be found in the remaining subordinate claims. These and other features of preferred embodiments of the invention appear not only in the claims but also in the description and the drawings, and the individual features can be realized each by itself or together in the form of subcombinations in the embodiment of the invention and in other fields, and can constitute advantageous as well as independently patentable embodiments, for which protection is hereby claimed.

DESCRIPTION OF THE DRAWING

The invention is explained with the aid of an embodiment represented in the drawing, wherein.

DESCRIPTION OF THE EMBODIMENT

Figure 1:
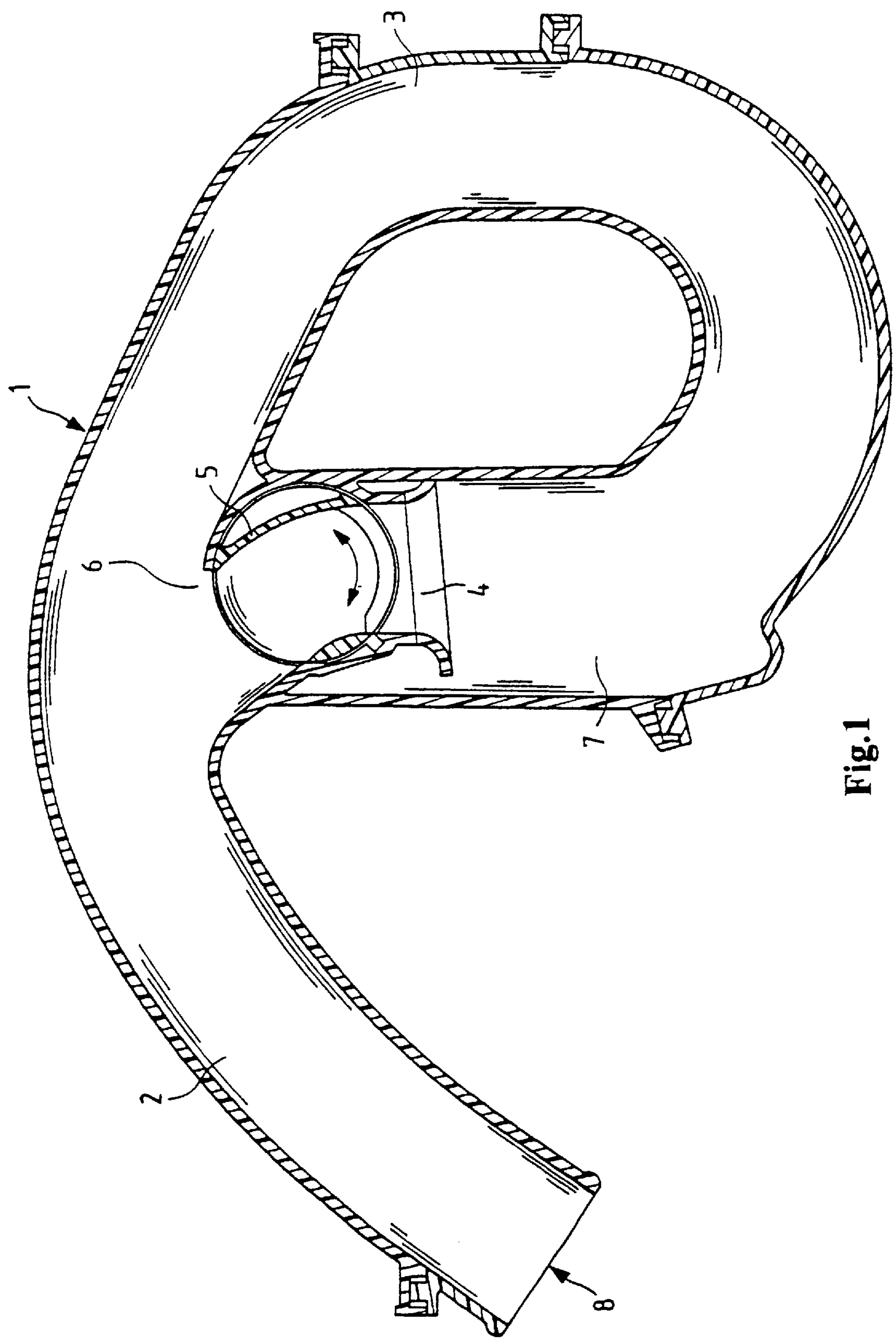
FIG. 1 is a section through an intake tube with two ram tubes.

An intake tube 1 represented in FIG. 1 is situated in the intake tract of an internal combustion engine not represented here nor further explained, for a motor vehicle. The intake tube 1 consists of at least one intake tract 2 which is situated between the cylinder head of the internal combustion engine, not shown, and its cylinder head connection opening 8, and the mouth area 6. Also, two ram tubes 3 and 4 and an intake distributor 7 are present.

In the area of the cylinder head connection opening 8 the intake tube 1 is connected to the internal combustion engine, not shown, by means of a likewise not shown flange.

The number of cylinders in the internal combustion engine determines the number of intake tracts of the intake tube 1, at least one intake tract being provided for each cylinder of the internal combustion engine. The intake tract extends from the cylinder head connection opening 8 to the mouth area 6. In the mouth area 6 the tubular path of the intake tract of intake tube 1 branches into a long ram tube 3 and a short ram tube 4. Both ram tubes 3 and 4 lead together into an intake distributor into which also the ram tubes of other cylinders, here not shown, also lead. The common intake distributor of the intake tube 1 communicates with the clean-air side of an air filter, likewise not shown here.

The rotary damper 5, which is responsible for the question of flow management in the intake tube 1 is directly at one end of the short ram tube 4 which faces the mouth area 6. The rotary damper 5 is configured in its geometry such that it continuously varies the cross section of the short ram tube 4 from its closed position to its fully open position, which is represented in FIG. 1, and permits any cross section between them.

Figure 2:
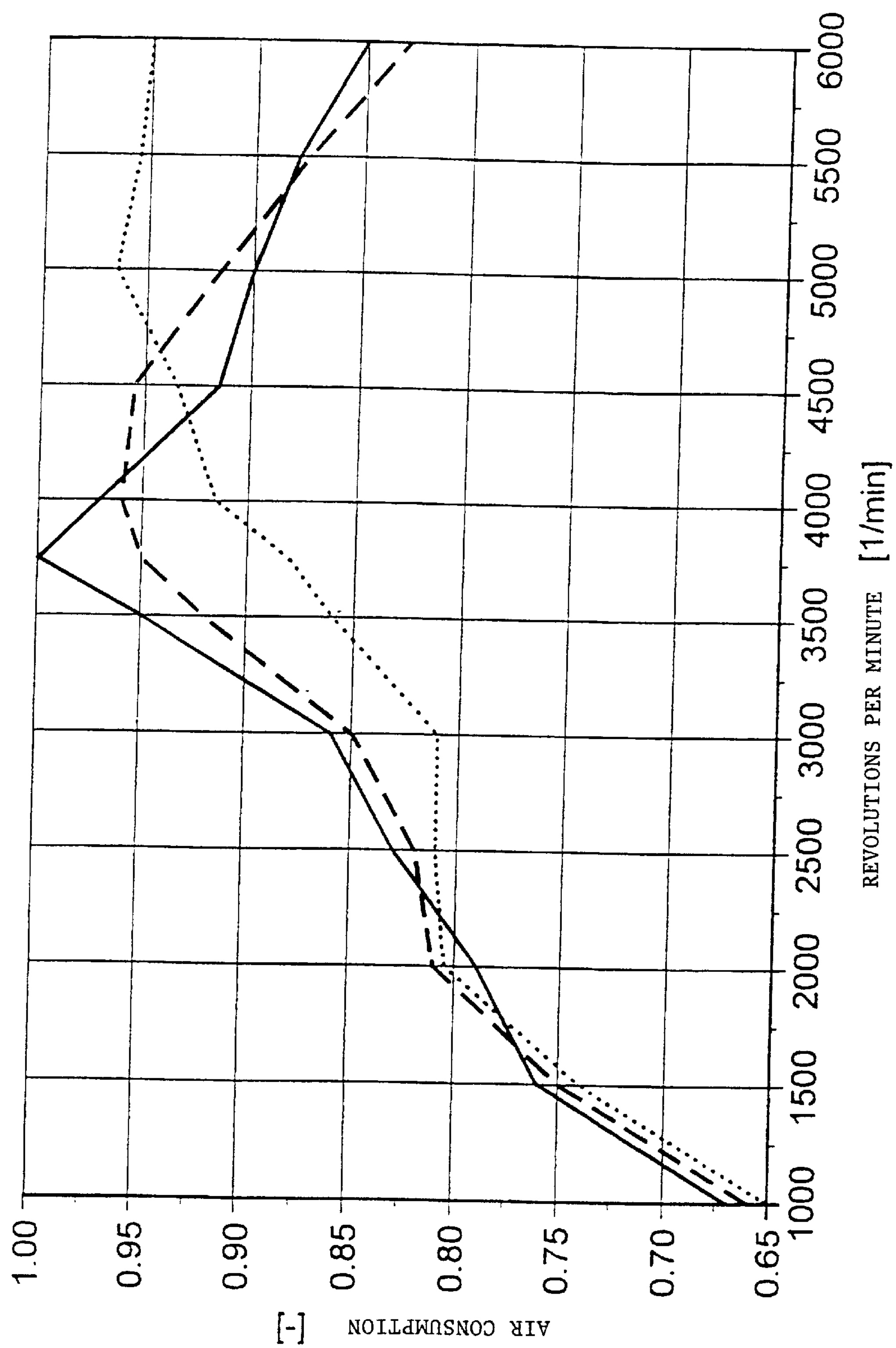
FIG. 2 shows the air consumption curves for different rotary damper settings in the intake tube.

In FIG. 2 are shown the curves representing the air consumption of an internal combustion engine in relation to the motor speed for three intake tube specifications. The solid line representing the case of unvarying intake tube geometry shows a curve at which a maximum air consumption is established in the range between 3500 and 4000 revolutions per minute.

The dotted line shows the curve of the air consumption in an intake tube in which it is possible to vary the ram tube geometry so as to switch from one geometry to the other. Here a maximum air consumption appears at about 5000 revolutions per minute.

The course of the broken line in FIG. 2 clearly indicates that, through the use of a steplessly controllable ram tube 4 (cf. FIG. 1) according to the invention, a variability in the shape of the ram tube geometry occurs which further optimizes the air consumption curve, which is to be seen in FIG. 2 especially in the range between 3800 and 4500 revolutions per minute. But even in low rotary speed ranges an optimization of the air consumption can be achieved, as it can be seen from the broken line in the range around 2000 revolutions per minute.

Instead of the rotary damper 5, any kind of switching valve can be used. Of course, the use of a flap valve is also possible.

The intake distributor 7 is represented in FIG. 1 as a common collecting chamber for ram tube 3 and ram tube 4. It is also possible, however, to provide separate collecting chambers for each of the ram tubes. These separate collecting chambers are opened and closed by a rotary damper. The two collecting chambers can also be switched about, that is, one rotary damper is to be arranged on the first collecting chamber such that it either opens a passage cross section to the first collecting chamber or closes it and simultaneously opens the passage cross section to the second collecting chamber. With the use of a rotary damper different variants are conceivable. What is important in the invention is the stepless control of the air consumption through a valve or through a rotary damper, at least two rotary dampers being opened or closed simultaneously or separately.

What is claimed is:

1. A method for controlling the quantity of intake air admitted to an air intake manifold for an internal combustion engine, wherein the air intake manifold comprises at least two suction pipes of different length, each of said at least two suction pipes communicating with an air distributor to feed air from the air distributor to the internal combustion engine, and a rotary valve for closing at least one of said at least two suction pipes, wherein said rotary valve is continuously adjustable to any position between a fully open position and a fully closed position.

2. A method according to claim 1, wherein the rotary valve is electromagnetically controlled.

3. A method according to claim 1, wherein the rotary valve is hydraulically controlled.

4. An air intake manifold for an internal combustion engine, said air intake manifold comprising at least two suction pipes of different length, each of said at least two suction pipes communicating with an air distributor to feed air from the air distributor to the internal combustion engine, and a rotary valve for closing at least one of said at least two suction pipes, wherein the rotary valve is continuously adjustable to any position between a fully open position and a fully closed position.

5. An air intake manifold according to claim 4, wherein said rotary valve is mounted in the intake pipe of shortest length.

6. An air intake manifold according to claim 5, wherein the rotary valve is disposed at an open end of the intake pipe of shortest length.

7. An air intake manifold according to claim 4, wherein the rotary valve is controlled by a vacuum actuator.

8. An air intake manifold according to claim 4, wherein the rotary valve is controlled by an electromagne tic actuator.

9. An air intake manifold according to claim 4, wherein the rotary valve is controlled by a hydraulic actuator.

10. An air intake manifold according to claim 4, wherein the rotary valve is actuated by a coupled push-pull rod.

11. An air intake manifold according to claim 4, wherein the rotary valve is controlled by a stepper motor.

12. An air intake manifold according to claim 4, wherein the rotary valve is doped with lubricants.

* * * * *